(12) United States Patent
Sall et al.

(10) Patent No.: US 8,997,628 B2
(45) Date of Patent: Apr. 7, 2015

(54) INTEGRATED MAGNETOSTRICTIVE LINEAR DISPLACEMENT TRANSDUCER AND LIMIT SWITCH FOR AN ACTUATOR

(75) Inventors: Kelly Sall, Vancouver (CA); Christopher Bruce Mytting, Surrey (CA); Tat Lung Ray Wong, Richmond (CA); Mike Lowrie, Coquitlam (CA)

(73) Assignee: Marine Canada Acquisition Inc., Richmond (CA)

( * ) Notice: Subject to any disclaimer, the term of this patent is extended or adjusted under 35 U.S.C. 154(b) by 1469 days.

(21) Appl. No.: 12/464,238

(22) Filed: May 12, 2009

(65) Prior Publication Data

US 2009/0288554 A1 Nov. 26, 2009

Related U.S. Application Data

(60) Provisional application No. 61/056,052, filed on May 26, 2008.

(51) Int. Cl.
*G01D 5/48* (2006.01)
*F01B 31/12* (2006.01)

(52) U.S. Cl.
CPC ............... *G01D 5/485* (2013.01); *F01B 31/12* (2013.01)

(58) Field of Classification Search
CPC ................................. F01B 31/12; G01D 5/485
USPC .................. 92/5 R, 5 L, 259; 91/361
See application file for complete search history.

(56) References Cited

U.S. PATENT DOCUMENTS

| | | | |
|---|---|---|---|
| 4,788,489 A | 11/1988 | Kobayashi et al. | |
| 4,794,841 A * | 1/1989 | Kemmler et al. | 91/361 |
| 4,901,628 A | 2/1990 | Krage | |
| 5,685,377 A | 11/1997 | Arstein et al. | |
| 5,717,330 A | 2/1998 | Moreau et al. | |
| 5,813,313 A * | 9/1998 | Stoll et al. | 92/5 R |
| 6,322,404 B1 | 11/2001 | Magee et al. | |
| 6,509,733 B2 | 1/2003 | Blubaugh | |
| 6,588,313 B2 | 7/2003 | Brown et al. | |
| 6,722,261 B1 | 4/2004 | Brown et al. | |
| 6,726,511 B1 | 4/2004 | Schelman | |
| 6,745,666 B2 | 6/2004 | Zilioli | |
| 6,824,435 B2 | 11/2004 | Divisi | |
| 6,951,067 B1 | 10/2005 | Dietz et al. | |
| 7,023,199 B2 | 4/2006 | Blubaugh et al. | |
| 7,121,185 B2 | 10/2006 | Alrefai | |
| 7,208,940 B2 | 4/2007 | Withanawasam et al. | |
| 7,225,060 B2 | 5/2007 | O'Connor et al. | |
| 7,230,419 B2 | 6/2007 | Godoy et al. | |
| 7,288,931 B2 | 10/2007 | Granig et al. | |
| 2009/0083459 A1 | 3/2009 | Harish | |
| 2009/0134927 A1 | 5/2009 | Thomas et al. | |

* cited by examiner

*Primary Examiner* — F. Daniel Lopez
(74) *Attorney, Agent, or Firm* — Cameron IP

(57) ABSTRACT

The present invention relates to a position sensor and limit switch apparatus for an actuator. The actuator has a cylinder and a piston with at least one magnetized portion reciprocatingly disposed within the cylinder. The apparatus includes an elongate housing aligned parallel with the cylinder. A magnetostrictive linear displacement transducer is disposed within the housing for sensing the position of the at least one magnetized portion. The apparatus includes a switch means responsive to the transducer for operatively interrupting actuation of the piston upon the at least one magnetized portion reaching a limit position.

14 Claims, 11 Drawing Sheets

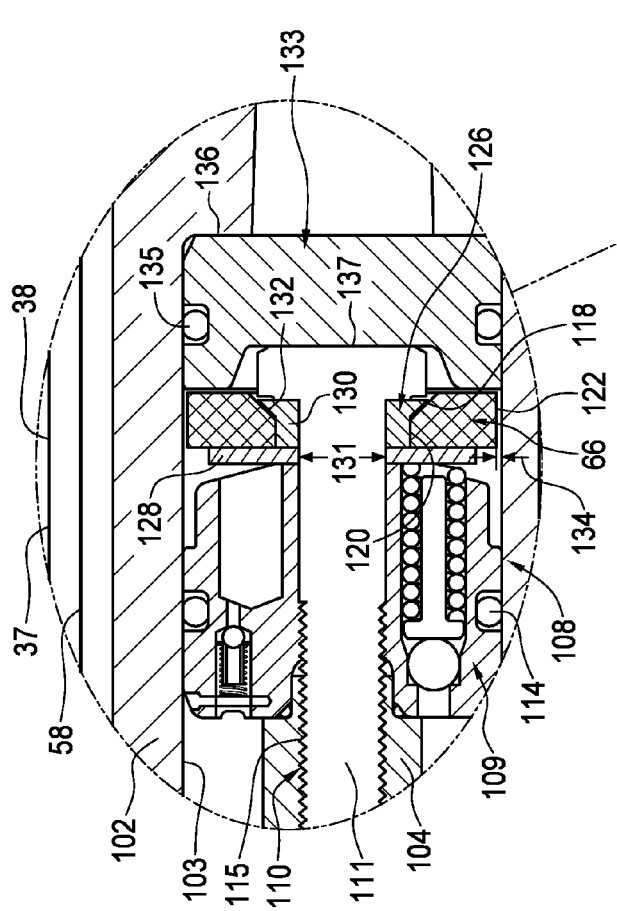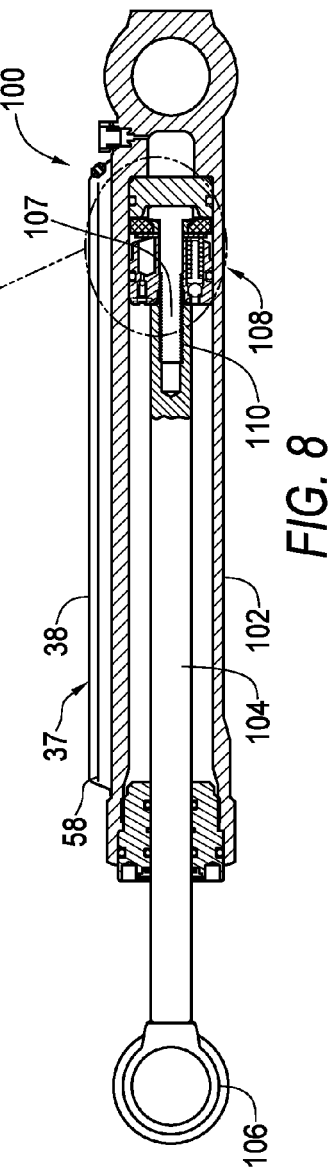
FIG. 8A
FIG. 8

INTEGRATED MAGNETOSTRICTIVE LINEAR DISPLACEMENT TRANSDUCER AND LIMIT SWITCH FOR AN ACTUATOR

CROSS REFERENCE TO RELATED APPLICATION

This application claims the benefit of provisional application 61/056,052 filed in the United States Patent and Trademark Office on May 26, 2008, the disclosure of which is incorporated herein by reference and priority to which is claimed pursuant to 35 U.S.C. section 120.

FIELD OF THE INVENTION

The present invention relates to a position sensor and limit switch apparatus for sensing and limiting linear displacement of an object, such as a piston within an actuator, and, in particular, to a position sensor and limit switch apparatus using a magnetostrictive effect.

DESCRIPTION OF THE RELATED ART

It is known to use a rotary trim position sensor and a separate rotary trim limit switch for sensing the position and limiting the position of an actuator comprising a trim cylinder and a piston reciprocatingly mounted therein. In this regard, FIG. 1 shows a rotary trim position sensor 20 comprising a potentiometer 21 within a case 22, and having cable 24 and connectors 26. FIG. 1 also shows a manual, rotary trim limit switch 28 comprising a switch element 29 within a case 30, and having cable 32 and connectors 34.

FIG. 2 shows a bottom plan view of the cases 22 and 30. The rotary trim position sensor 20 and the rotary trim limit switch 28 are externally connected via central, rotatable portions 27 and 35, respectively, to the tilt axis of a marine outdrive similar to that shown in FIGS. 12 and 13. The outdrive can be rotated about the tilt axis via the reciprocating movement of the piston within the trim cylinder, as is known by those skilled in the art and therefore not described in detail. The rotation of portion 27 of the rotary trim position sensor 20 may be correlated to the position of the piston within the trim cylinder. When the portion 35 of the rotary trim limit switch 28 rotates past a certain limit, the rotary trim limit switch 28 provides a high resistance that inhibits further rotation and hence further movement of the piston within the trim cylinder.

The above-described prior art suffers a number of disadvantages. The rotary trim limit switch 28 may be prone to failure. Moreover, the rotary trim limit switch 28 may be difficult to replace if it fails. The cases 22 and 30 result in both a rotary trim position sensor 20 and a rotary trim limit switch 28 that are bulky and require significant space.

BRIEF SUMMARY OF INVENTION

The present invention provides a position sensor and limit switch apparatus that overcomes the above disadvantages. It is an object of the present invention to provide an improved position sensor and limit switch apparatus.

According to one aspect of the invention, there is provided a position sensor and limit switch apparatus for an actuator. The actuator has a cylinder and a piston with at least one magnetized portion reciprocatingly disposed within the cylinder. The apparatus includes an elongate housing aligned parallel with the cylinder. A magnetostrictive linear displacement transducer is disposed within the housing for sensing the position of the at least one magnetized portion. The apparatus includes a first switch means responsive to the transducer for operatively interrupting actuation of the piston upon the at least one magnetized portion reaching a limit position.

BRIEF DESCRIPTION OF DRAWINGS

Referring to the drawings:

FIG. 8 is a longitudinal section of a hydraulic actuator with the position sensor and limit switch apparatus installed externally thereon;

FIG. 8A is a blown up section view of FIG. 8 showing a piston including a magnet;

FIG. 9A is a blown up section view of FIG. 9 showing the piston with magnet;

DESCRIPTION OF THE PREFERRED EMBODIMENTS

Figure 3:
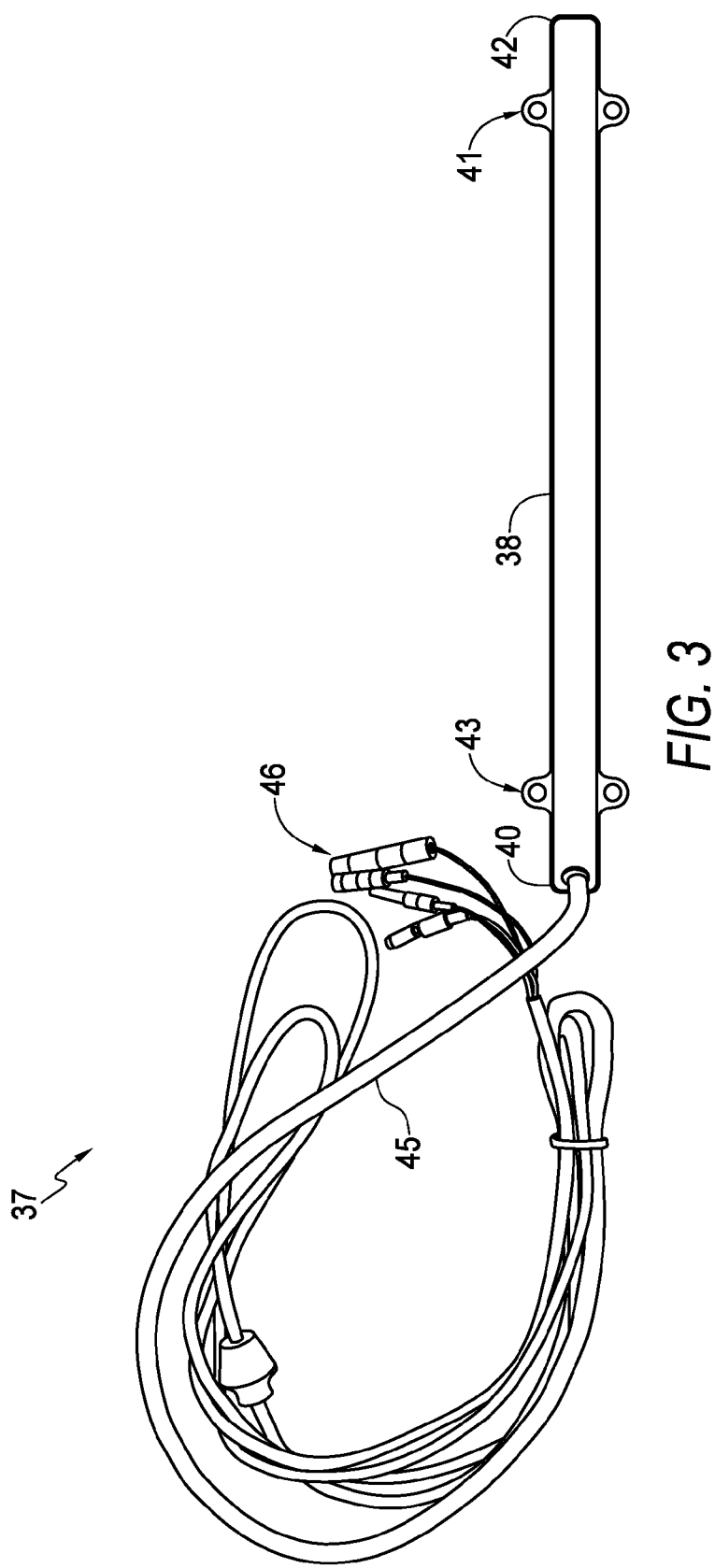
FIG. 3 is a top plan view of a position sensor and limit switch apparatus according to one embodiment of the invention.

FIG. 3 illustrates a position sensor and limit switch apparatus 37 according to one aspect of the present invention. The position sensor and limit switch apparatus 37 includes a sealed housing 38. In this example the housing is aluminium. The housing 38 extends from a proximal end 40 to a distal end 42. Spaced-apart flanges 41 and 43 extend outwardly from the housing 38 for connecting the apparatus 37 to, for example, the exterior of an actuator. The actuator in this example may be a hydraulic actuator 100, as shown in FIG. 8, having a cylinder, in this example, a trim cylinder 102, and a piston 108 received therein. Referring back to FIG. 3, cable 45 extends from the proximal end 40 of the apparatus 37 to a plurality of connectors 46.

Figure 4:
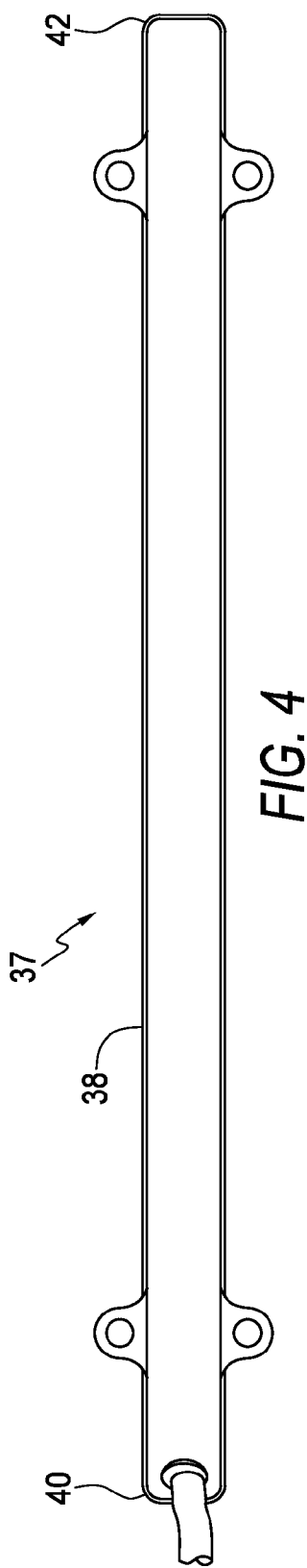
FIG. 4 is an enlarged top plan view of the position sensor and limit switch apparatus of FIG. 3.
Figure 5:
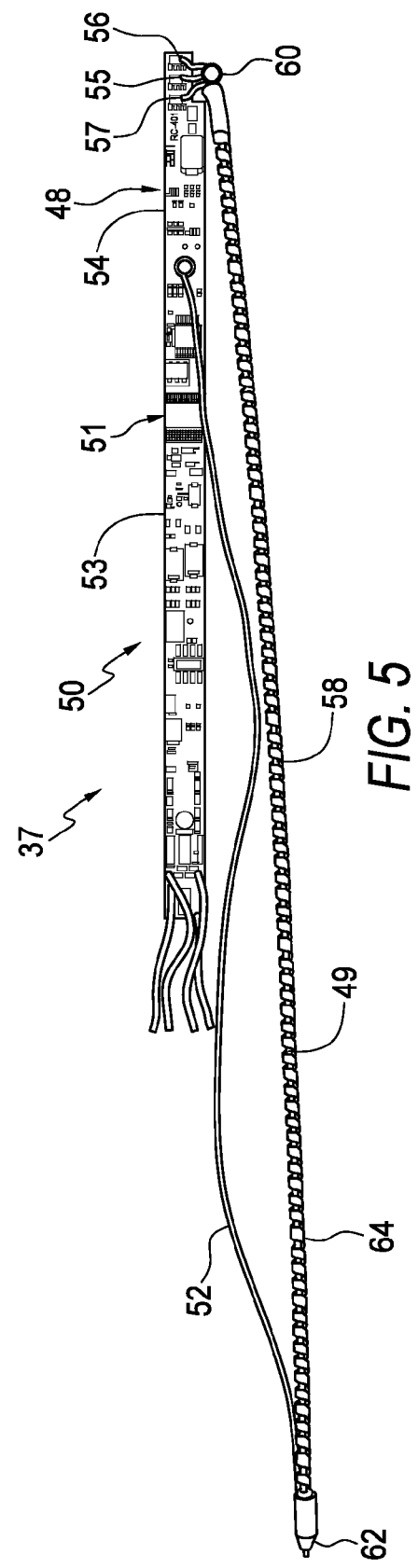
FIG. 5 is a top plan view of the position sensor and limit switch apparatus of FIG. 4 with the housing removed, illustrating a magnetostrictive linear displacement transducer and a switch assembly.

FIG. 4 shows the position sensor and limit switch apparatus 37 encased within housing 38. FIG. 5 shows the interior of the position sensor and limit switch apparatus 37 with the housing 38 removed. The housing 38 integrates the various parts of the position sensor and limit switch apparatus 37 in a compact, rugged, and sealed manner. This is advantageous for withstanding impact and submersion in water.

Referring to FIG. 5, the position sensor and limit switch apparatus 37 has a magnetostrictive linear displacement transducer 48 which includes circuit 54 in this example the circuit being on part of a circuit board 51. A switch assembly 50 including circuit 53 is also on part of the circuit board 51. The components generally shown in FIG. 5, which include the transducer 48 and the switch assembly 50, are disposed within housing 38 of FIG. 4 which is then sealed with polyurethane molding.

The magnetostrictive linear displacement transducer 48 can be used in a number of different applications for a number of different types of actuators. The use of magnetostrictive linear displacement transducers for sensing the position of a piston within a trim cylinder is known in the art, as described for example in U.S. Pat. No. 5,717,330 to Moreau et al., the full disclosure of which is incorporated herein by reference. Accordingly, magnetostrictive linear displacement transducers and their operation per se will not be discussed in greater detail.

Figure 6:
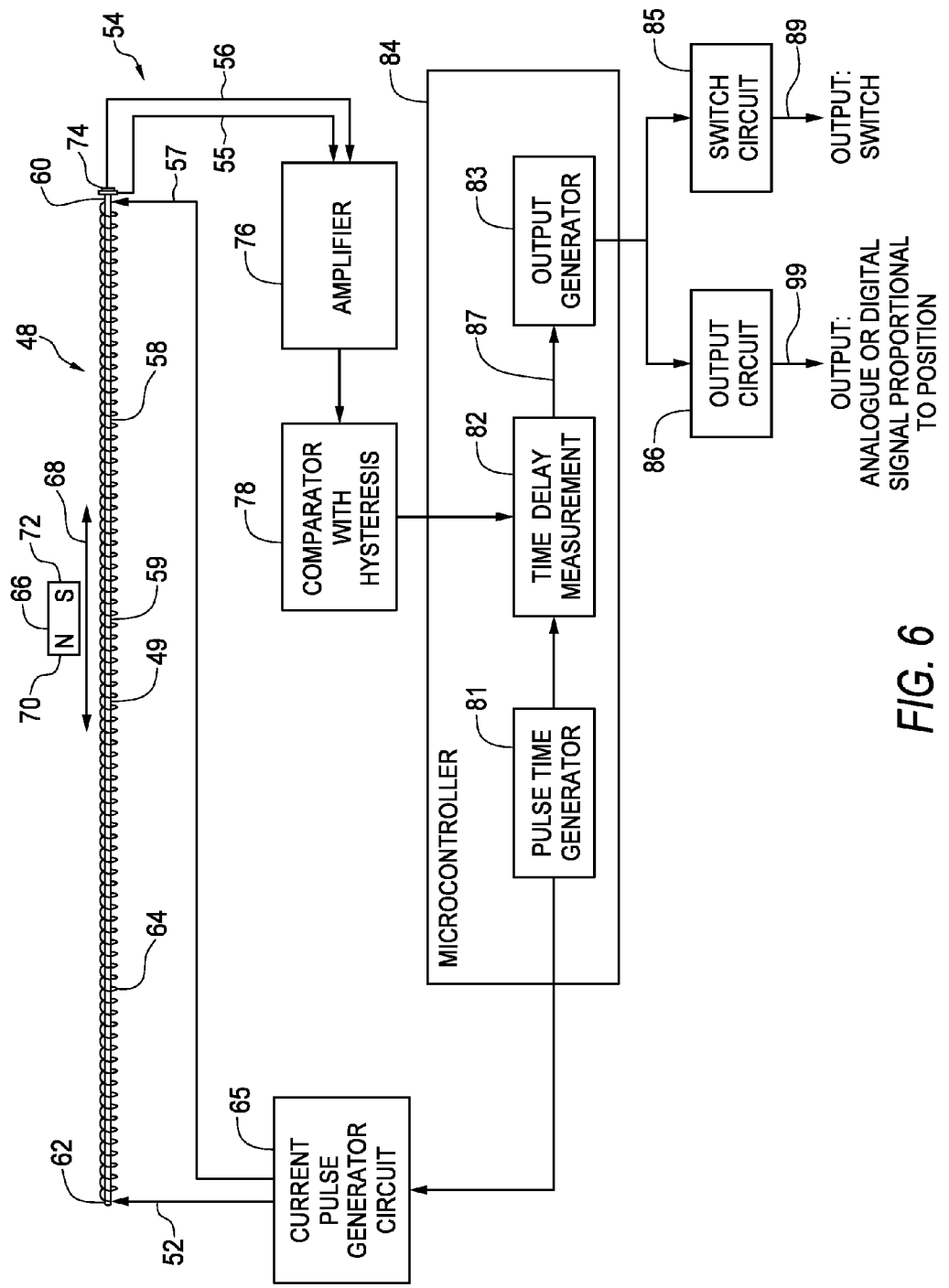
FIG. 6 is a diagrammatic view of the magnetostrictive linear displacement transducer of FIG. 5.
Figure 9:
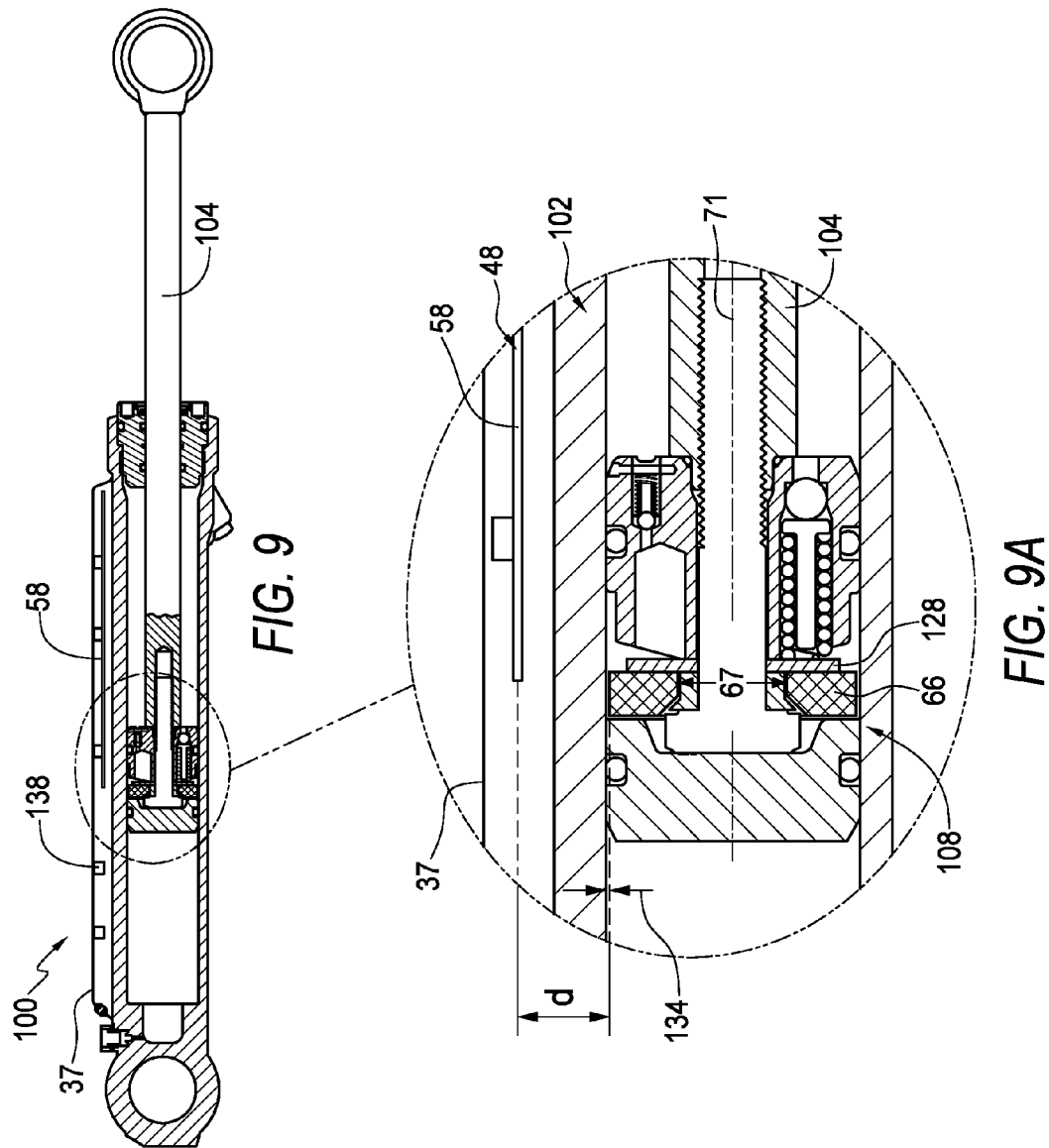
FIG. 9 is a mirror image of FIG. 8 showing the position sensor and limit switch also in section.

Referring to FIGS. 5 and 6, there is an elongated member 58. The elongate member 58 is supported by a series of inserts 138, as shown in FIG. 9. Referring back to FIGS. 5 and 6, the elongate member 58 in this example is a wire of a material having a high magnetostriction coefficient. A range of between $+20 \times 10^{-6}$ $\Delta l/l$ to $+30 \times 10^{-6}$ $\Delta l/l$ is preferred. The material used in this example is NIRON 52 ™ available from Carpenter Technology Corporation. The wire utilized has a diameter of 0.025". Other materials and other types and dimensions of elongated members could be substituted. However, the material should have a high magnetostriction coefficient and a high stiffness. Iron/cobalt, metglass and ferrites are also suitable. A tubular member could also be substituted. The elongate member 58 has a first end 60, a second end 62 and a straight portion 49 extending between the ends. Alternatively the elongate member could be curved or flexible.

An excitation coil 64 of an electrically conductive material is wound about the elongate member 58 along the straight portion 49 between ends 60 and 62. The elongate member 58 and excitation coil 64 together may be referred to as a sensor core. Alternatively one or more coils could be positioned adjacent to and along the elongate member 58. The coils could be wound about an inert casing about the elongated member 58. The coil 64 is of copper foil, 1/16" wide and 0.002" thick in this particular example, but other conductive materials, such as wire or film and materials with different dimensions could be substituted. The width of the foil strip, or the gage of the wire, can be selected, along with the turns per inch of the coil, to determine the inductance of the coil. Through this means a wide variety of operative DC voltages and transducer lengths can be accommodated. In this example the winding is such as to use a standard +5 v DC.

The coil 64 is connected via wires 52 and 57 to a current pulse generating circuit 65 which, together with the coil 64, provides a first means for magnetizing the elongate member 58 for short, discrete periods of time corresponding to pulses generated by the current pulse generating circuit 65. The current pulse generating circuit 65 provides some control and logic functions. It comprises an energy storage device (a capacitor) and an electronic switch (MOSFET) to release the energy into the coil 64 to produce the current pulse. Typical pulse durations are 5 microseconds long and the pulses are repeated at a frequency of one pulse per 3.2 milliseconds. This is suitable for a magnet 66 shown in FIG. 6, described below, which is 1/8" to 1/4" wide. In other embodiments other pulse durations, pulse frequencies and magnet dimensions may be used.

The magnet 66 is adjacent the elongate member 58 as seen in FIG. 6 and is movable along a path represented by arrows 68 adjacent the elongate member 58. The path extends between ends 60 and 62 of the elongate member 58. Alternatively the magnet 66 could be stationary and the magnetostrictive linear displacement transducer 48 would move. The magnet 66, in this example, is oriented so that north pole 70 and south pole 72 are aligned parallel to the elongate member 58 to oppose the field produced by the excitation coil 64. The magnet 66 could also be oriented 90° from the position shown. This has the effect of a more narrowly defined saturation zone but gives a reduced magnetic gap capability.

The magnet 66 may comprise, for example, the piston itself of a hydraulic actuator or may be mounted on such a piston. In one embodiment shown in FIG. 8A, the magnet 66 is a component of the piston 108 and has an annular shape. The magnet 66 defines an aperture 67 and longitudinal axis 71 as shown in FIG. 9A. The axis 71 is substantially parallel with the elongate member 58. The elongate member 58 and the coil 64 would typically be mounted parallel to the piston rod 104 and, preferably, on the exterior of the trim cylinder 102 which has a wall of a non-ferromagnetic material. The magnetostrictive linear displacement transducer 48 would be used in such an application to ascertain the position of the piston 108 within the trim cylinder 102. Details of such a combination are included below.

Referring back to FIG. 6, the pulse generating circuit 65 in this example provides pulses of DC current 5 microseconds long and spaced-apart by 3.2 millisecond intervals. The pulses have a rise time of 3 to 5 microseconds in this example. The peak current in this example is approximately 5 amps at 5 volts DC power input.

In this example a piezoelectric element 74 is connected directly to the first end 60 of the elongate member 58. The piezoelectric element 74 is connected via conductors 55 and 56 to an amplifier 76. The amplifier 76 functions as an amplifier and in this example provides an inverting gain of 2 and superimposes a 2.5V DC offset. The amplifier 76 has sufficient bandwidth to pass through the frequencies contained within the pulse. The amplifier 76 is connected to a comparator 78 which serves to generate digital pulses from the pulses generated from the piezoelectric element 74. The comparator 78 is a comparator with additional circuitry to create a hysteresis band. This ensures that the output does not oscillate due to noise or parasitic feedback when the input is near the trigger point. The circuit and operational details of the amplifier 76 and comparator 78 are known to those skilled in the art and therefore will not be described in greater detail.

A microcontroller 84 is connected to and receives input from the comparator 78. The microcontroller 84 is connected to and communicates with the current pulse generator circuit 65. Time delay comparison is performed within the microcontroller 84. The microcontroller 84 has a pulse time generator 81 connected to the current pulse generator circuit 65. The pulse time generator 81 performs control and logic functions within microcontroller 84. The pulse time generator 81 is programmed to set the length of the pulse generated. The pulse time generator 81 is programmed to set the frequency at which it generates pulses.

The microcontroller 84 has a time delay measurement circuit 82 that receives input from both the pulse time generator 81 and the comparator 78. The magnetostrictive linear displacement transducer 48 is defined to include the current pulse generator circuit 65, the elongate member 58, the excitation coil 64, the magnet 66, the amplifier 76, the comparator 78, the time delay measurement circuit 82, and the pulse time generator 81. The time delay measurement circuit 82 generates a position sensing output 87.

The microcontroller 84 has an output generator 83 that receives the position sensing output 87 of the time delay measurement circuit 82. The output generator 83 is programmed to create linear or non-linear analog outputs in the form of a voltage or current, and can produce digital outputs such as PWM and CAN for example.

Figure 10:
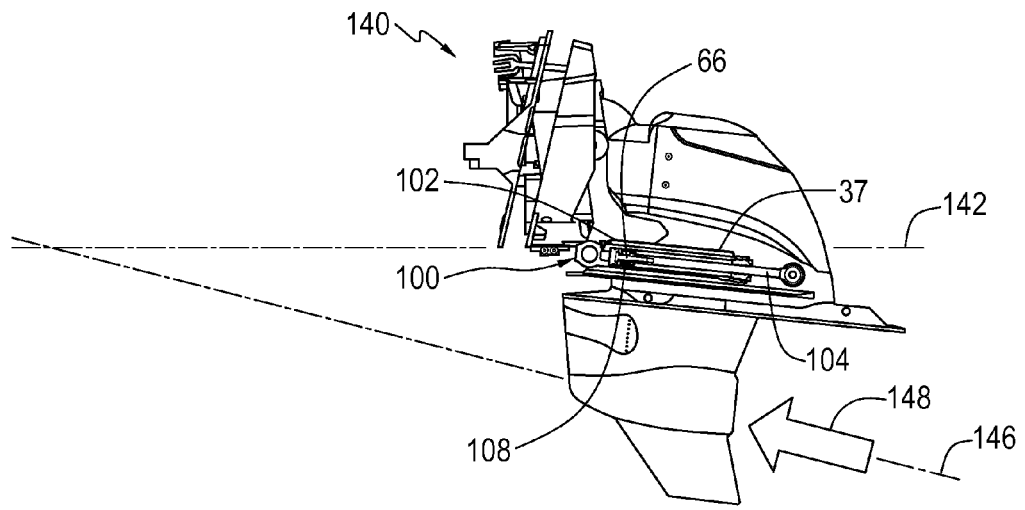
FIG. 10 is an elevation view of a marine outdrive with the hydraulic actuator of FIG. 9 shown in a fully retracted position.
Figure 11:
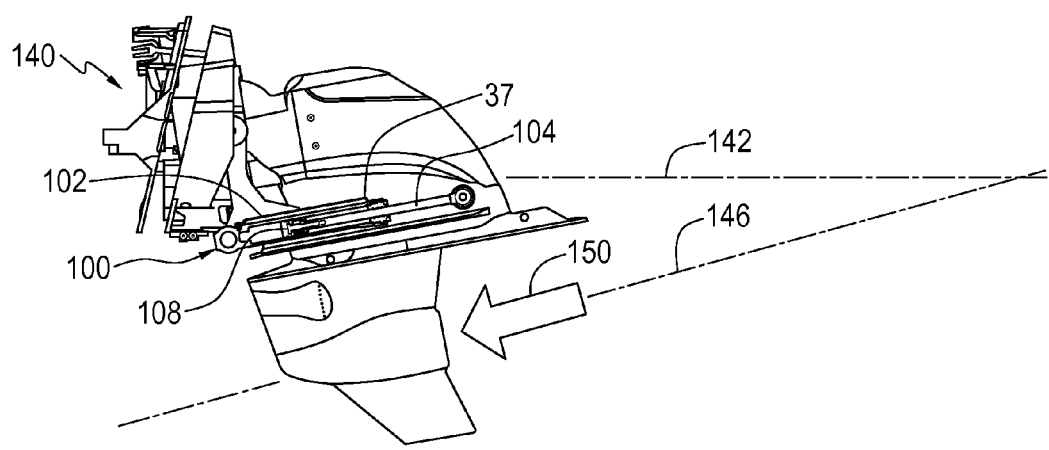
FIG. 11 is an elevation view of the outdrive of FIG. 10 with the hydraulic actuator shown extended to a trim-out limit position.
Figure 12:
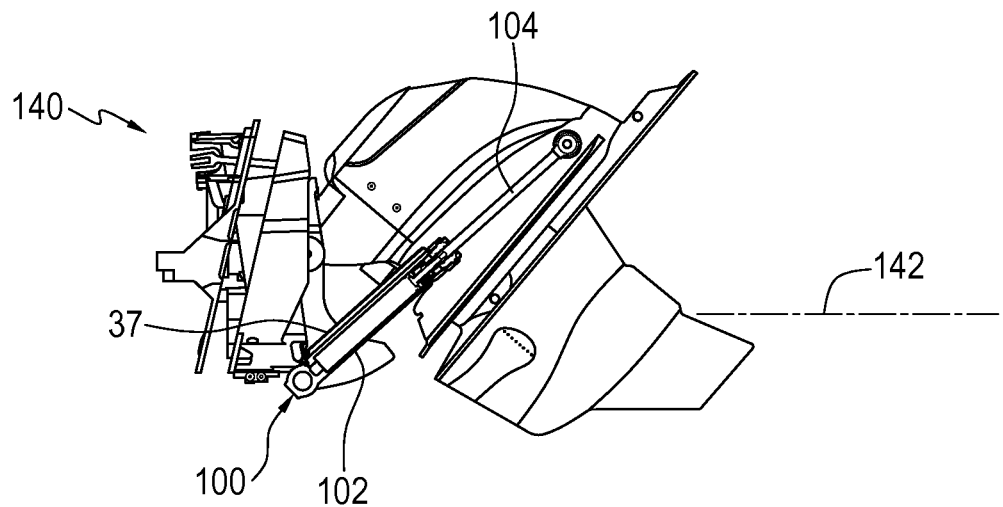
FIG. 12 is an elevation view of the outdrive of FIG. 10 with the hydraulic actuator shown in a fully extended position.

The output generator 83 is programmed to set a first limit position and a second limit position spaced-apart from the first limit position. The first limit position refers to a marine outdrive with a hydraulic actuator 100 such as that shown in FIG. 9. The first limit position corresponds to the piston 108 being fully retracted within the cylinder 102 to a trim-in position as shown in FIG. 10. The second limit position corresponds to the piston rod 104 being at least partially extended outwards from the cylinder 102. The second limit position may be a trim-out limit position as shown in FIG. 11, or a position fully extended to a tilt-out limit position as shown in FIG. 12. The output generator 83 is programmed to allow the first limit position and the second limit to be adjustable.

The output generator 83 is in communication with switch circuitry 85 which generates a switched output. It sets the value at which the switch circuitry 85 is enabled and disabled. The output generator 83 of the microcontroller 84 is in communication with output circuitry 86. The output circuitry 86 generates the analog or digital outputs depending on the model.

In a typical operating loop, every 3.2 milliseconds, the pulse time generator 81 of the microcontroller 84 sends a 5 microsecond digital signal to the current pulse generator circuit 65. The time delay measurement circuit 82 then starts a timer. The MOSFET contained in the current pulse generator circuit 65 is closed due to the digital signal from the pulse time generator 81. The closed MOSFET connects the capacitor contained in the current pulse generator circuit 65 to the coil 64. This in turn creates a current pulse through the coil 64.

Other types of pulse drivers or other means could be utilized in other examples to provide relatively short, but discrete pulses of current through the coil 64. Alternatively other means could be used for magnetizing the elongate member 58 for such short discrete periods of time.

The effect of the pulse generating circuit 65 and the coil 64 is to produce axial magnetic fields in the elongate member 58. As used herein the term "axial" refers to directions along the longitudinal direction of the elongate member 58, from the perspective of FIG. 6. The axial magnetic field produces a uniform field along the elongate member 58 and hence uniform magnetostriction. Also the axial magnetostrictive pulses result in less end bounce and distortion and are easier to dampen compared to torsional pulses. In this example the magnetic fields are sufficient to produce a magnetostrictive effect along the portion of the elongate member 58 co-extensive with the coil 64. The field produced is counter to the field of magnet 66 in this embodiment.

The magnet 66 is movable along the path indicated by the arrows 68. When the coil 64 is de-energized only a localized portion 59 of elongate member 58 adjacent the magnet 66 exhibits magnetostriction. In this example, this portion 59 is in magnetostriction saturation. When the coil 64 is energized, the rest of the elongate member 58 apart from this localized portion 59 exhibits magnetostriction, to a saturation level in this example. However the magnetic field created by the magnet 66 counters the magnetic field created by the pulse acting on the coil 64 in the localized portion 59. In this embodiment this portion 59 is taken out of the saturation caused by the magnet 66. Put another way, the magnetostrictive linear displacement transducer 48 creates a magnetic field around elongate member 58 and relies on the magnet 66 to provide a field in the opposite direction to nullify this generated field. The point at which these two fields cancel is the recorded position of the magnet 66. This sudden change in the magnetostriction in the localized portion 59 causes a strain pulse, in the form of sound waves, ultra sonic waves in this example, to propagate axially along the elongate member 58 from a point adjacent to the magnet 66.

There is also means for measuring time lags between initiation of each of the discrete periods of time when the current pulse generating circuit 65 provides pulses of current to the coil 64 and detection of corresponding sound waves formed in the elongate member 58 by the magnetostrictive effect adjacent the magnet 66 as each pulse is provided by circuit 65. Each pulse of current for all practical purposes instantaneously magnetizes the entire elongate member 58. Peak magnetization occurs at the peak of each pulse. The effect is repeated as each pulse is conducted from the current pulse generating circuit 65 to the coil 64. The rapidly changing magnetization creates magnetostrictive strain pulses in this example, in the elongate member 58, which start close to the position of the magnet 66 and are propagated along the elongate member 58 towards both ends at about 15,000 ft/sec.

It takes a finite time for ultrasonic waves to move along the elongate member 58 from the position of magnet 66 to the piezoelectric element 74 at first end 60 thereof. This time delay is indicative of the position of the magnet 66 along path 68 and along elongate member 58. It will be appreciated that the time delay is greater when the magnet 66 is near the second end 62 of the elongate member 58 and smaller as the magnet 66 approaches the piezoelectric element 74 at first end 60 of the elongate member 58.

The piezoelectric element 74 produces electrical pulses at the same frequency as the pulses of current pulse generating circuit 65, but with the time delay caused by the propagation of ultrasonic waves from the position on the elongate member 58 adjacent magnet 66 to first end 60 thereof. The piezoelectric element 74 in this example is approximately 0.1" square although other configurations such as circular elements could be substituted.

Figure 6A:
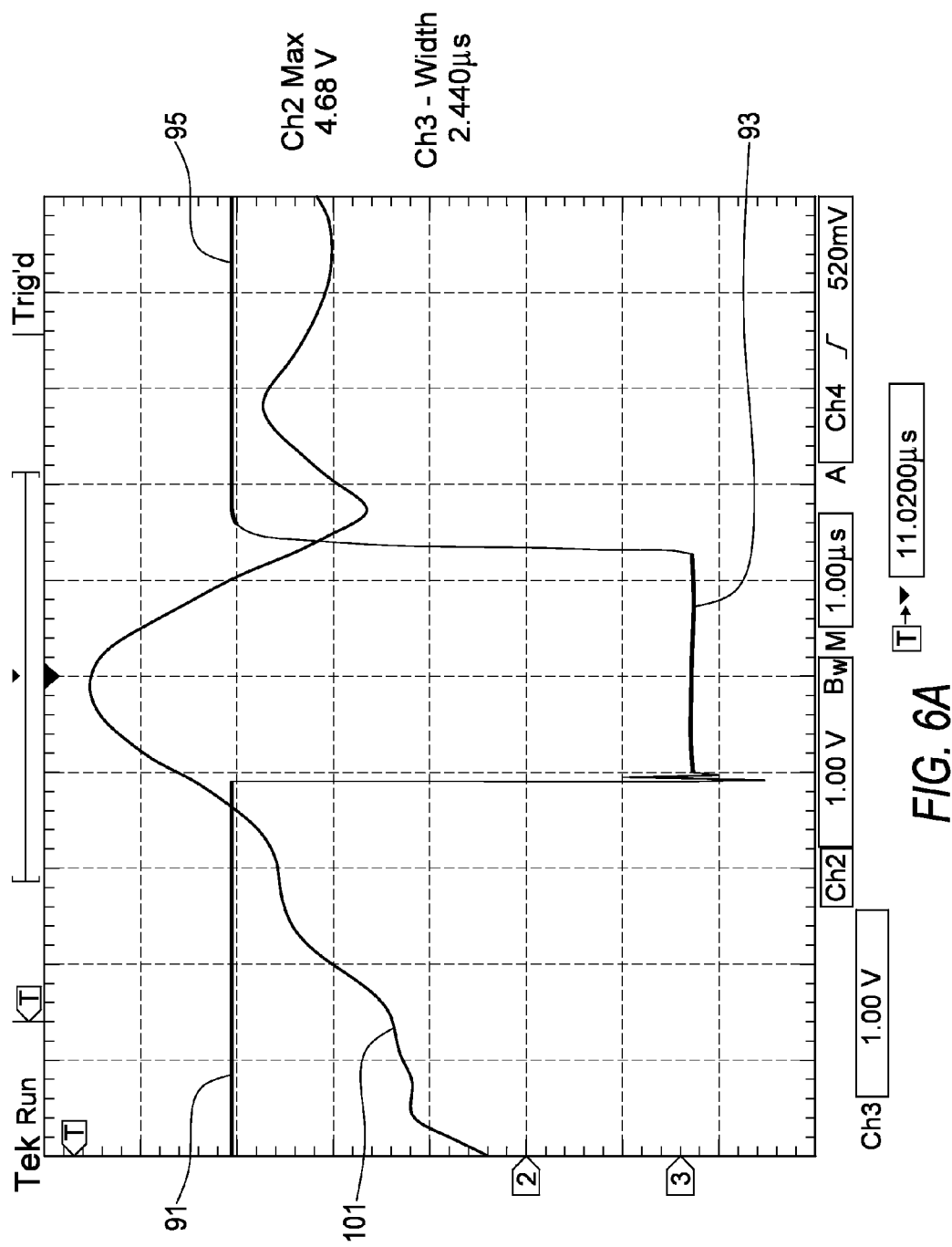
FIG. 6A is a graph illustrating an amplified signal from the transducer and a corresponding output signal from a comparator of the transducer.

The output of the piezoelectric element 74 is inverted, amplified and offset by amplifier 76. The amplified signal from amplifier 76 is conducted to comparator 78 as an amplified pulse 101, as shown by way of example in the chart of FIG. 6A. If the amplified pulse 101 from amplifier 76 is higher than the comparator threshold in comparator 78, the comparator, which normally outputs a "high" signal 91, will output a "low" signal 93. Once the amplified pulse from amplifier 76 falls below the comparator threshold in comparator 78, the comparator will output its normal "high" signal, as shown by signal 95. The comparator 78 output is conducted to the time delay measurement circuit 82. The time delay measurement circuit 82 stops the timer when "low" signal 93 is received.

The time delay measurement circuit 82 calculates the time between the start of the 5 microsecond pulse generated by the pulse time generator 81 and the "low" signal generated from comparator 78. If no "low" signal from comparator 78 is received by time delay measurement circuit 82 within a programmed time period, the time delay measurement circuit 82 will use a programmed time value known as the "default output".

The time calculated by the time delay measurement circuit 82 is indicative of the position of the magnet 66. The time delay measurement circuit 82 produces the position sensing output 87. The positioning sensing output 87 is sent to the output generator 83. The output generator 83 calculates the required output that corresponds to the value or position sensing output 87 received by the time delay measurement circuit 82.

Figure 1:
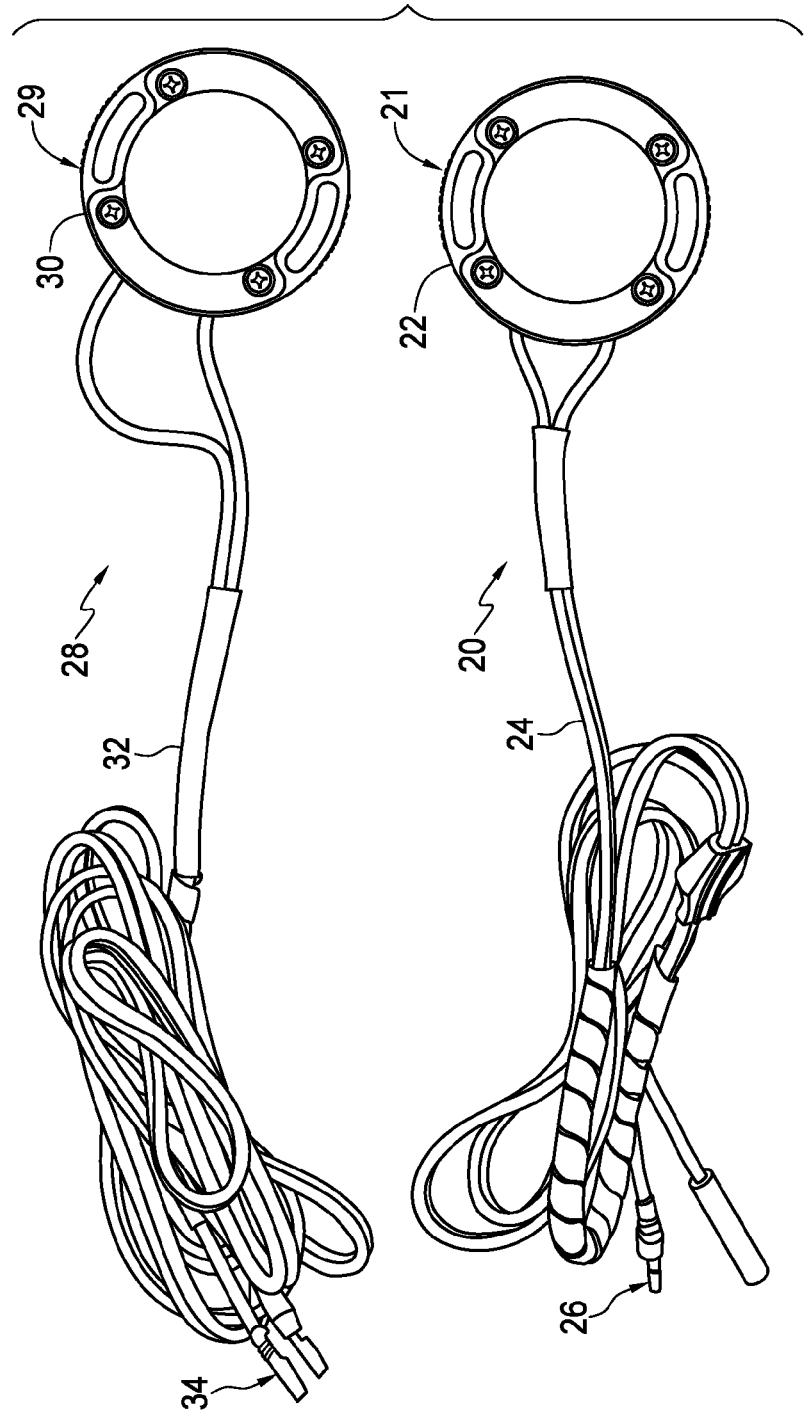
FIG. 1 is a top plan view of a rotary trim position sensor and a rotary trim limit switch according to the prior art.
Figure 7:
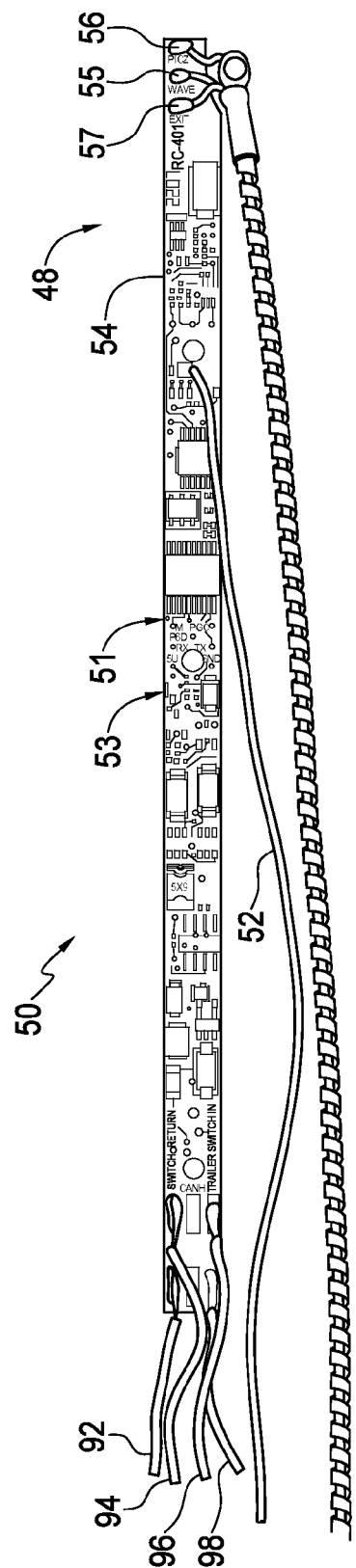
FIG. 7 is an enlarged top plan view of the switch assembly of FIG. 5.

The output generator 83 drives switch circuitry 85 to enable or disable the circuit connected to output 89. The switch circuitry 85 is enabled when the value of output generator 83 is above a programmed "on" threshold. The switch circuitry 85 is disabled when the value of output generator 83 is below a programmed "off" threshold. In other words switch circuit 85 acts as a limit switch, replacing switch 28 of the prior art shown in FIG. 1. Referring to FIG. 7, in this example, conductor 94 acts as the 'limit switch out' wire, conductor 96 acts as the 'limit switch in' wire but since the switch is bi-directional, a signal can be passed in either direction.

The output generator 83 also drives the output circuitry 86. In this example output circuit 86 generates a pulse-width modulated (PWM) output 99 that mimics or "fakes" the resistance generated by, for example, the rotary trim position sensor 20 of the prior art shown in FIG. 1. The pulse-width modulated output 99 from the output circuitry 86 is proportional to the position of the magnet 66. The pulse-width modulated output 99 is superimposed on conductor 92 of FIG. 7, which is a power and signal line. Conductor 98 is the corresponding ground signal. The power source (trim gauge) is essentially a current source. During the "high time" of the PWM signal, the circuit draws enough power for it to fully operate. The "low time" is required to sink current in order to mimic or "fake" the resistance that would normally be generated by for example, the rotary trim position sensor of the prior art shown in FIG. 1. In other words the output 99 indicates the tilt or trim position.

In this example, output 99 in the form of a PWM signal drives a trim gauge (not shown) for a user of a marine craft. Output 99 can broadcast or provide a discrete number indicative of the position of the piston 108 shown in FIG. 8. Output 89 may connect to a throttle-based actuation switch used to actuate the hydraulic actuator 100 shown in FIG. 8. Output 89 may be configured to interrupt the throttle-based actuation switch at set trim limits.

In this example, the position sensor and limit switch apparatus 37 employs a closed feedback control system, though this is not necessarily required.

FIGS. 8 and 8A show a typical installation of the position sensor and limit switch apparatus 37 of FIG. 3 on an actuator, in this example, the hydraulic actuator 100. In this example, the hydraulic actuator comprises a high performance trim cylinder and piston assembly under a high hydraulic pressure of, for example, 1800 psi. The trim cylinder 102 has an inner, annular wall 103, and the piston rod 104 is disposed therein. The position sensor and limit switch apparatus 37 is mounted to the outside of the trim cylinder 102 such that the elongate member 58 extends parallel to the piston rod 104.

Referring back to FIGS. 8 and 8A, the piston rod 104 has an outer end 106 spaced-apart from the trim cylinder 102 and an inner end 107 with a bore 110 extending inwards therefrom which in this example has threads 115. The piston 108 is connected to inner end 107 of the piston rod. The piston 108 includes a first part 109 which in this example is made of steel for strength requirements. The first part 109 has an o-ring 114 to enable the first part 109 to sealingly and slidably engage wall 103 of the cylinder. The first part 109 of the piston 108 significantly distorts and weakens the magnetic field of the neighbouring magnet 66 since it is made of a magnetic material, in this example steel. To preserve what remains of the magnetic field, a second part 133 of the piston in this example is made of a non-magnetic material, in this example aluminum. The second part 133 of the piston is spaced-apart from the first part 109. In the piston position shown in FIG. 8A, the second part 133 is abutting end wall 136 of the trim cylinder 102. The second part 133 has an o-ring 135 to enable the second part to sealingly engage wall 103.

The magnet 66 in FIG. 8A is interposed between the first part 109 and second part 133 of the piston. In this example, the magnet 66 is a ceramic 8 magnet. The magnet has an outer, annular wall 122 that is spaced apart from the wall 103 of the trim cylinder 102 by a gap 134. On the one hand, gap 134 should be as narrow as possible. This is so as to minimize the distance d as shown in FIG. 9A between the magnet 66 and elongate member 58 for generating a good signal. However, the gap 134 must be sufficiently large to allow for fluid to pass by piston 108 in the event of, for example, a large impact affecting outdrive 140 shown in FIG. 10. Referring back to FIG. 8A, the magnet 66 has an inner, annular wall 120 and a tapered wall 118 extending outward therefrom.

The placement, orientation and strength of the magnet 66 in the hydraulic actuator 100 are important to the operation of the magnetostrictive linear displacement transducer 48. Components that neighbour the magnet 66 tend to have an effect on its strength if they are composed of ferromagnetic materials. Thus the strength of the magnet 66 should be considered carefully and the overall variation of the strength of the installed magnets should be controlled. A large contributor to the variation in installed strength or the "magnetic signature" of the trim cylinder 102 is the distance d shown in FIG. 9A between the surface of the magnet 66 and the distance to the elongate member 58 or core of magnetostrictive linear displacement transducer 48. The strength decays as a cubic function of distance, thus this distance needs to be controlled.

Contributors to the value in this distance d include: the configuration and material of magnet 66 itself; of the hardware and components used to secure the magnet; of the position sensor and limit switch apparatus 37 and its internal hardware; and of the trim cylinder 102 which in this example is made of aluminum. The trim cylinder 102 is subject to constraints that dictate a minimum distance d since it is a pressure vessel and must have a wall thick enough to handle elevated impact pressures.

A washer 128 is interposed between the first part 109 of the piston and the magnet 66. The washer 128 is made of steel according to one preferred embodiment.

A spacer 126, shown in FIG. 8A, is shaped and positioned to receive the magnet 66. The magnet 66 is located in the space created by the spacer 126 and washer 128. Since the washer 128 is made steel, however, the magnet adheres to it. The spacer has an aperture 131 and in this example is made of stainless steel. The spacer includes an inner portion 130 that may abut inner wall 120 of the magnet 66. The spacer has a tapered wall 132 that extends outwardly from the inner portion 130. The spacer is designed so that the magnet 66 can only be received therein in a set orientation: where the outwardly extended, tapered wall 132 of the spacer 126 can align and abut with the tapered wall 118 of the magnet. This acts to eliminate a possible problem of the prior art: installing the magnet backwards, in a reversed and incorrect polar alignment. Put another way, the magnet and the hardware for piston 108 have been designed for error-proof assembly such that the proper orientation of the magnet 66 is assured.

The spacer 126 is held against the washer 128 by a ferromagnetic, central member, in this example a bolt 111 that passes through the center of the assembly. The bolt 111 abuts inner wall 137 of the second part 133 of the piston 108. The bolt 111 in this example is axially aligned with the trim cylinder 102, adjacent to magnet 66, and is threadedly received by recess 110 of the piston rod 104. The bolt in this example is made of a high tensile steel. The bolt is advantageously designed to spread the magnetic field generated by the magnet 66. To remove the magnet 66, the bolt 111 must be removed first, and the spacer 126 lifted clear.

Figure 13:
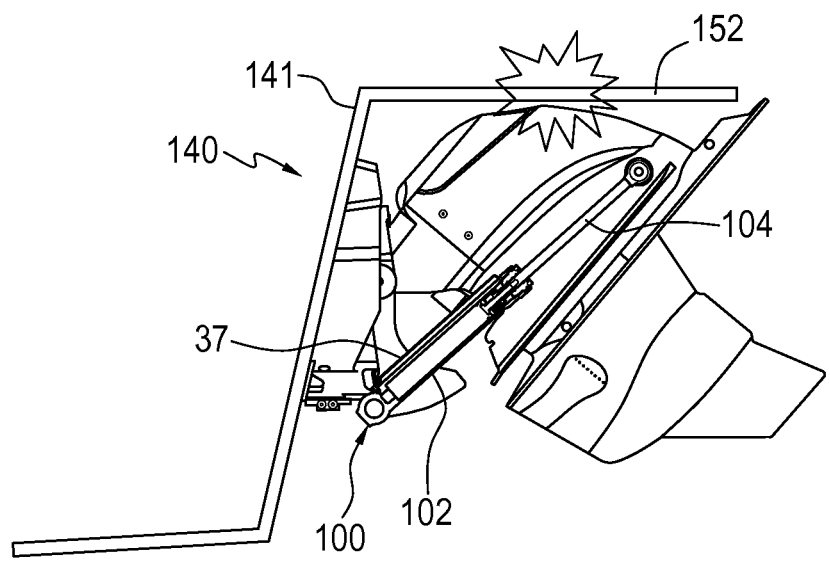
FIG. 13 is an elevation view of the outdrive of FIG. 10 shown colliding with a swim platform and decking of a marine craft.

FIGS. 10 to 13 show the outdrive 140 of a marine craft 141 as shown in fragment in FIG. 13 connected to the hydraulic actuator 100 of FIGS. 9 and 9A. The position sensor and limit switch apparatus 37 is mounted onto the trim cylinder 102.

FIG. 10 shows the hydraulic actuator 100 in a full trim-in position, where the piston rod 104 is fully retracted within the trim cylinder 102. The outdrive 140 includes a propeller axis 146. The thrust vector, which is co-axial with the propeller axis 146, is shown by arrow 148 pointing upwards from the perspective of FIG. 10 and towards plane 142. The plane 142, which may be horizontal, is substantially parallel to the water line. This is the position where the outdrive 140 is completely "tucked-in", bringing the rear part of the propeller axis 146 from the perspective of FIG. 10 angled below plane 142. The effect is to raise the stern and lower the bow of the marine craft. The position of the trim cylinder 102 is determined by the position of the magnet 66 as sensed by the position sensor and limit switch apparatus 37.

A trim-in limit is sometimes needed on certain marine craft to prevent the outdrive 140 from retracting past a certain point. This is because some marine craft become unstable when their bows are pitched very low. In extreme cases, the bow can tend to dip low enough to plow underwater. This trim-in limit may be achieved conventionally by installing a spacer within the trim cylinder 102, below the piston 108, so that the fully retracted length of the hydraulic actuator 100 is longer than that of a stock or standard hydraulic actuator.

In the alternative, the position sensor and limit switch apparatus 37 may be used instead of a spacer. Accordingly, once the magnet 66 reaches this trim-in limit, the switch assembly 50 of the position sensor and limit switch apparatus 37 mimics a very high resistance signal which is relayed to interrupt the throttle-based actuation switch (not shown) and thereby prevent the piston 108 from retracting past the trim-in limit any further. The trim-in limit may be pre-set or programmed by the user.

The limits of the position sensor and limit switch apparatus 37 are set as parameters in a controller running a pump. The pump is hydraulically connected to the hydraulic actuator 100. The position of the trim cylinder 102 is detected by the position sensor and limit switch apparatus 37 and reported to the controller. The controller stops the pump when the limit is reached.

FIG. 11 shows the hydraulic actuator 100 in a trim-out limit position, where the piston rod 104 is extended to a trim-out limit, which may be pre-set or programmed by the user. The propeller axis 146 and thrust vector 150 extend downwards to the left from the perspective of FIG. 11 and are at a positive angle to the plane 142. The result is that the bow of the marine craft is angled upwards relative to plane 142. The trim-out limit is the maximum extended position where it is considered safe to operate the marine craft under power. A trim-out limit is needed because there may be concerns about extending the outdrive 140 past a certain point with the engine running. At high speeds, a marine craft with a highly pitched bow can become difficult to control. Also, at high angles of tilt, the typical rubber encasement of the drive-shaft universal joint (not shown) can become damaged if the engine is running. If this encasement is damaged, water can enter the marine craft.

To overcome these problems, once the magnet 66 reaches this trim-out limit position, the switch assembly 50 portion of the position sensor and limit switch apparatus 37 mimics a very high resistance signal which is relayed to interrupt the throttle-based actuation switch (not shown) and thereby prevents the piston rod 104 from extending past the trim-out limit any further.

The range between the full trim-in position of FIG. 10 and the trim-out limit position of FIG. 11, or alternatively between the trim-in limit and the trim-out limit, is called the trim range. Within this range, the position sensor and limit switch apparatus 37 allows the pitch of the marine craft to be adjusted by the user to optimize the engine output for the given sea conditions and desired speed.

FIG. 12 shows the hydraulic actuator 100 in a full tilt-out position, where the piston rod 104 is in a fully extended position and the outdrive 140 is completely "up". The maximum clearance between the outdrive 140 and the ground is achieved for loading the marine craft into and out of the water and when performing certain service operations.

However, in some marine craft, the outdrive 140 may extend upwards from the perspective of the FIG. 12 more than is desired or required. This may lead to a collision between the outdrive 140 and structures extending aft of the transom such as, for example, a swim platform and decking 152, as shown in FIG. 13. Such collisions may result in damage to the marine craft and/or outdrive 140.

Accordingly, a tilt-out limit is sometimes required on certain marine craft to prevent the outdrive 140 from reaching its full extension. A limit is conventionally achieved by installing a spacer above the piston so that the fully extended position of the hydraulic actuator 100 is shorter than the stock or standard hydraulic actuator.

The present invention removes the need for such a spacer by providing either a pre-set or programmable extension switch limit enabled through the position sensor and limit switch apparatus 37 that effectively stops the piston rod 104 from extending and hence the outdrive 140 from rising past the tilt-out limit.

Many advantages result from the structure of the present invention. For example, the present invention provides an apparatus that is cognisant of piston position. Moreover, the present invention provides the advantage of combining two functions in one: 1) reporting a piston or trim position; and 2) performing as a limit or trim switch.

A further advantage provided by the present invention stems from the position sensor and limit switch apparatus 37 being programmable. As a result, a user may disable the trim function (or switch) at a point dictated by the user. Also, the user may customize the trim-in, trim-out, and tilt-out limits according to their specific needs.

Figure 2:
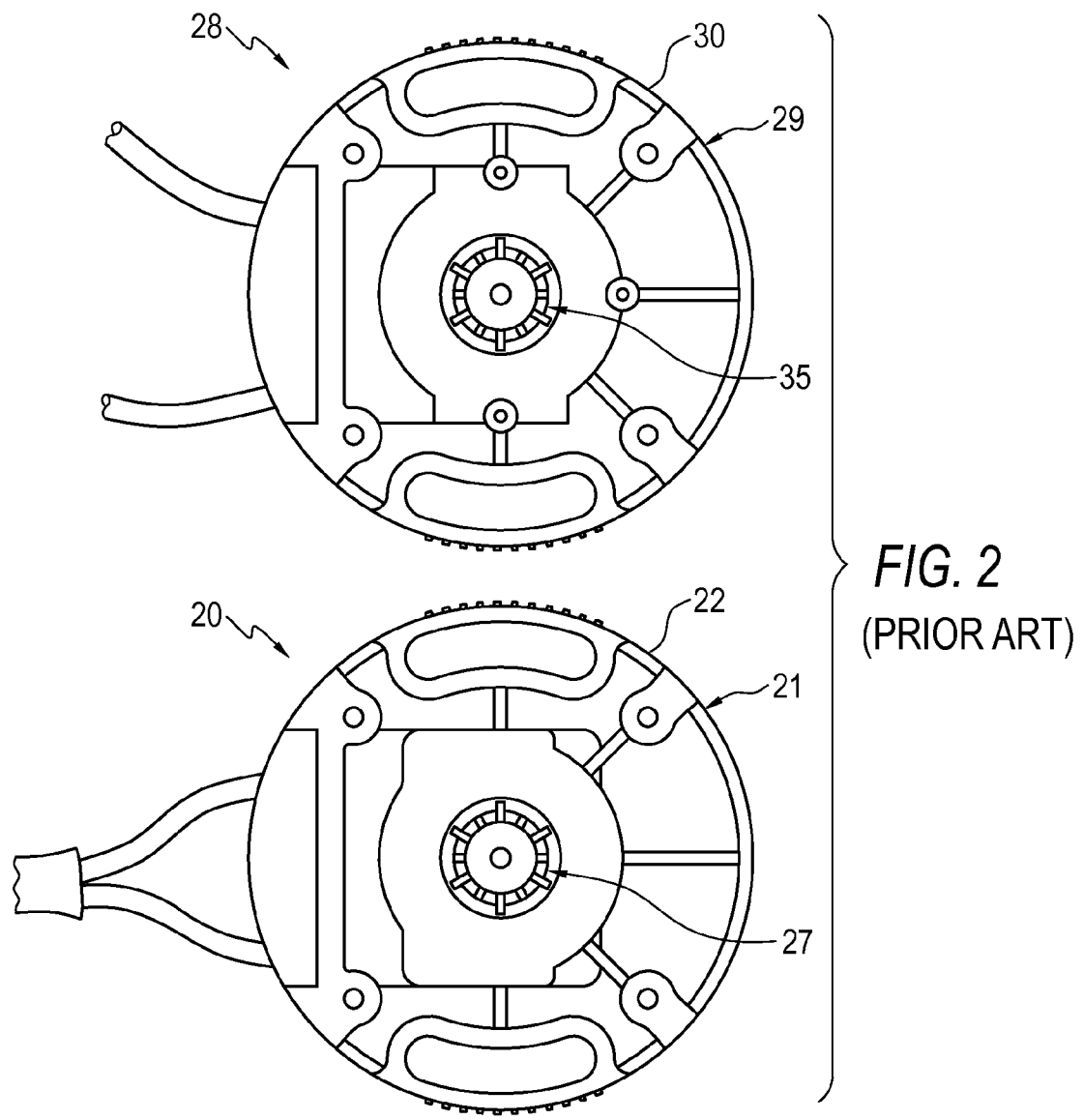
FIG. 2 is a bottom plan, partial view of the rotary trim position sensor and the rotary trim limit switch of FIG. 1.

The position sensor and limit switch apparatus 37 is compact and slim. As a result, only a small hole through the transom is needed for the assembly of the position sensor and limit switch apparatus 37—unlike the bulky devices with cases 22 and 30 of the prior art shown in FIGS. 1 and 2.

There are also special problems associates with sensing positions for high pressure cylinders. High pressure cylinders typically require thick walls to prevent rupture. Thicker walls result in a greater distance between the external sensor and the internal magnet. The present invention has overcome this challenge by using a large magnet and then tuning the sensor to the magnetic field.

It will be appreciated that many variations are possible within the scope of the invention described herein.

For example, the position sensor and limit switch apparatus 37 need not be limited to the use of actuators in the form of trim cylinders and trim switches. There may be many applications beyond such uses, including use of the apparatus 37 in other types of actuators in other conditions, as well as for example cable steering systems, as would be appreciated by those skilled in the art.

The position sensor and limit switch apparatus 37 of the present invention could be installed on a marine craft having an outboard motor in a closed control system.

If more than one switch is required, the circuit 53 of the switch assembly 50 can be modified accordingly. For example, more channels together with software switches may be added in order to obtain more than one switch. This provides a further advantage over the prior art.

It will be understood by someone skilled in the art that many of the details provided above are by way of example only and are not intended to limit the scope of the invention which is to be determined with reference to the following claims.

What is claimed:

1. In combination, a hydraulic actuator for a marine craft, and a position sensor and limit switch apparatus therefor, the hydraulic actuator having a trim cylinder and a piston with at least one magnetized portion reciprocatingly disposed within the trim cylinder, said at least one magnetized portion of the piston comprising an annular magnet, the annular magnet having an aperture with a tapered wall extending therefrom, the piston including a central member extending through the annular magnet, the central member being ferromagnetic, and the piston further including a spacer interposed between the magnet and the central member, the spacer having a radially extending tapered wall, the magnet being positioned in a set orientation with respect to its poles when the tapered wall of the spacer abuts with the tapered wall of the magnet, the apparatus comprising:
   an elongate housing aligned parallel with the cylinder;
   a magnetostrictive linear displacement transducer disposed within the housing for sensing the position of said at least one magnetized portion; and
   a limit switch which operatively interrupts actuation of the piston upon said at least one magnetized portion reaching a trim-out limit position, said limit switch being responsive to the transducer, the trim-out limit position being a maximum extended position of the piston considered safe to operate the marine craft under power.

2. The combination as claimed in claim 1, wherein the transducer provides a position sensing output indicative of the position of said at least one magnetized portion, the limit switch being operatively responsive thereto, and the combination further including an output circuit that operatively receives the position sensing output and generates a pulse-width modulated output, the pulse-width modulated output mimicking a conventional rotary trim position sensor.

3. The combination of claim 2, the pulse-width modulated output being one from the group consisting of voltage output, a current output and a digital output.

4. The combination of claim 2, the position of said at least one magnetized portion corresponding to a position of the piston, the pulse-width modulated output providing a discrete number indicative of the position of the piston.

5. The combination as claimed in claim 1, the actuator having a piston rod extending from the piston, the limit switch being responsive to the transducer which operatively interrupts action of the piston upon the at least one magnetized port reaching a first limit position, the first limit position corresponding to the piston rod being fully retracted within the cylinder.

6. The combination as claimed in claim 5, wherein the limit switch operatively interrupts actuation of the piston upon said at least one magnetized portion reaching a second limit position, the second limit position being spaced-apart from the first limit position, the second limit position corresponding to the piston rod being in at least a partially extended position.

7. The combination of claim 6, wherein the limit switch further includes switch circuitry, wherein the transducer provides a position sensing output and the combination further includes an output generator that receives the position sensing output and drives the switch circuitry, the output generator enabling the switch circuitry when the value of the output generator is above a specified threshold, the output generator disabling the switch circuitry when the value of the output generator is below the specified threshold.

8. The combination as claimed in claim 7, the output generator being programmable to set the value at which the switch circuitry is enabled and to set the value at which the switch circuitry is disabled.

9. The combination of claim 1, wherein the transducer includes an elongated member of a material with a large magnetostriction coefficient and having a first end and a second end, said at least one magnetized portion being adjacent the member, the combination further including an excitation coil extending along the member, means for generating electrical signals, said means being connected to the coil and producing axial magnetic fields along the member, and means for determining time delays between said signals and axial strain pulses travelling along the member caused by magnetostrictive changes in the member adjacent said at least one magnetized portion and accordingly the position of said at least one magnetized portion along the member, the means for determining including a piezoelectric device connected to the first end of the member, the means for determining providing a position sensing output.

10. The combination of claim 1, wherein the transducer and the limit switch are disposed within the housing, and the combination further includes polyurethane molding disposed within the housing for sealing the housing, and the transducer and the limits switch thereby.

11. The combination as claimed in claim 1, wherein the trim cylinder is designed to operate at a pressure of up to 1800 psi.

12. The combination as claimed in claim 1, the annular magnet defining an axis, said axis being substantially parallel with the magnetostrictive linear displacement transducer.

13. The combination as claimed in claim 1, wherein the elongate housing is made of a non-ferrous material.

14. The combination as claimed in claim 1, the annular magnet defining an axis, said axis being substantially parallel with the magnetostrictive linear displacement transducer.

* * * * *